NEGATIVE CONDUCTANCE SWITCH CIRCUIT

Filed April 4, 1961

Inventor
A.Sato-A.Fujie
By [signature]
Attorney

1

3,189,753

NEGATIVE CONDUCTANCE SWITCH CIRCUIT

Akihiko Sato and Akio Fujie, Tokyo, Japan, assignors to Nippon Electric Company, Limited, Tokyo, Japan, a corporation of Japan Filed Apr. 4, 1961, Ser. No. 120,808
1 Claim. (Cl. 307—88.5)

This invention relates to improvements in negative conductance circuits and more particularly to a negative conductance circuit employing a double base diode having a hook construction. Hook-type, double base diodes are known and the details of same may be seen in U.S. Patent #2,939,056.

It is to be noted that the above patent refers to the element as a transistor. Either nomenclature is correct and depends upon whether one visualizes the final element as being promulgated upon a junction transistor with an emitter alloy layer added, or as stemming from a double base diode with a hook region added.

This invention teaches how negative conductance may be utilized in a double base diode having a hook construction.

Accordingly, it is an object of this invention to provide a negative conductance circuit in a double base diode having a hook construction.

It is still a further object of the invention to provide a negative conductance circuit utilizing a double base diode having a hook construction arranged as a switching circuit.

The above mentioned and other features and objects of this invention and the manner of obtaining them will become more apparent and the invention itself will be best understood by reference to the following description of two embodiments of the invention taken in conjunction with the accompanying drawing in which.

Figure 1:
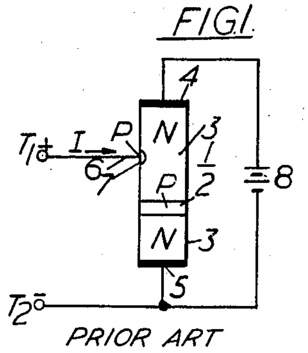
FIG. 1 is a schematic circuit of a known type double base diode.

Referring now to FIG. 1, there is schematically shown a circuit including a double base diode 1 of hook type construction of the type disclosed in said U.S. patent. This type of diode comprises a P-type portion 2 of semiconductive material sandwiched between two bodies of N-type semi-conductive material 3. The outer portions of the N-layers of material have attached thereto base electrodes 4 and 5. An emitter electrode 6 is attached to a small zone of P-type conductive material 7, which is embodied in one of the end zones 3. This P-type small zone must be set close to a P-type portion 2. Operating potential is supplied by source 8 and is disposed across base electrodes 4 and 5, the potential at the electrode 4 being positive.

Another voltage is adapted to be applied across the terminals T1 and T2 and which terminals are connected to the emitter electrode 6 and the base electrode 5 so that a positive potential is applied to the emitter.

Figure 2:
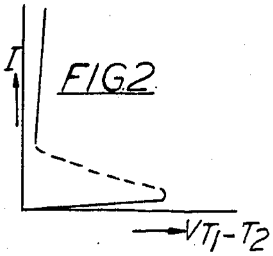
FIG. 2 is a curve of the negative resistance characteristics of the circuit shown in FIG. 1.

This connection of potentials gives rise to the negative resistance characteristic plotted in the curve of FIG. 2.

Figure 3:
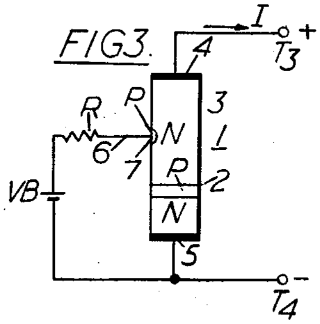
FIG. 3 is a schematic diagram of the invention.

In FIG. 3, a double base diode 1, similar to that shown in FIG. 1, is connected in accordance with our invention so that a bias VB having the polarity shown is connected by the emitter electrode 6 and the base electrode 5 via the resistance R. The terminals T3 and T4 are connected to the base electrodes 4 and 5, respectively, and there is adapted to be connected thereacross another potential having polarity as shown. It should be noted that although resistor R does not play an essential role in obtaining the negative conductance characteristic, it acts as a current limiter for preventing destruction of the hook-type characteristic for the double base diode 1. The resistor R participates in determining the maximum current I and regulates and adjusts the switching speed of the switching circuit as will be described hereinafter with reference to FIG. 5. More particularly, in order to explain the function of the resistor R for controlling the switching speed, if R is small, then a large current will flow through R and a large charge will be stored in the minority carrier in the hook-type double base diode 1 and consequently, slow switching speeds will result. On the other hand, if the resistor R is very large, only small emitter current will flow through resistor R and as a result the time required for the diode 1 to switch the output current I will be reduced and the current amplification of the diode 1 will also be reduced. If the resistor R is too large, it will result in reduction of the amplification factor of the diode to a point where it is impossible to obtain output current of desired magnitude. Thus, for example, if the bias voltage is 1.5 volts, a suitable value for R to provide good operation would be between 5–20 kilo-ohms.

Figure 4:
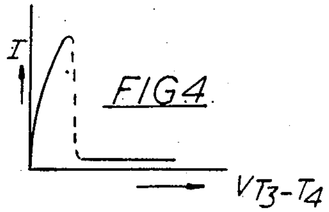
FIG. 4 is a curve of the negative conductance characteristic obtained from the circuit in FIG. 3.

This arrangement gives a negative conductance characteristic as can be seen from the curve plotted in the graph shown in FIG. 4.

A comparison of the curves of FIGS. 2 and 4 will show the reversed relation between the voltage and current.

Figure 5:
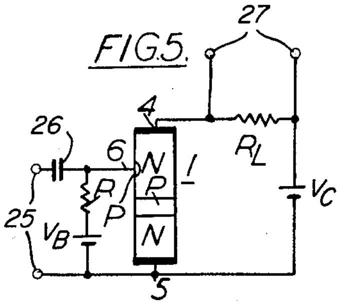
FIG. 5 is a diagram showing a switching circuit utilizing the invention.

In FIG. 5 the invention is shown applied to a double base diode of the type shown in the other figures of the drawing but the external circuit is arranged to function as a switching circuit. The emitter biasing arrangement similar to that shown in FIG. 3 is utilized and the output may be taken from the circuit across the load resistor $R_L$.

Figure 6A:
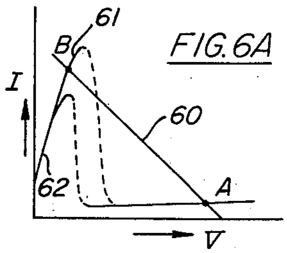
FIG. 6A shows an I–V characteristic curve for explaining the operation of the circuit of FIG. 5.

The operation of the device of FIG. 5 is as follows: with the bias voltage connected through the resistor R to the emitter electrode 6 designated $V_B$, and with the voltage of the power source connected to the resistor $R_L$ designated $V_C$, the following will hold: if these voltages are selected such that $V_B$ is smaller than $V_C$, then the hook-type double base electrode 1 will be operated in the low conductance or "off" state, which state is shown as point A of FIG. 6A; if a positive pulse $V_P$ is applied through the pair of input terminals 25 across the voltage source $V_B$ and the resistor R (and wherein a capacitor 26 is connected serially to one of said input terminals) such that $V_C$ is smaller than $V_B+V_P$, then the diode 1 will be switched to the high conductance state. This high conductance state is shown as point B in FIG. 6A. Upon termination of the positive pulse, the circuit will remain at point B. At this time, if a negative pulse is applied to the input terminals 25 this will effectively decrease the bias voltage $V_B$ and this in turn will reduce the hole injection into the semi-conductor device at the emitter. Accordingly, the maximum output current appearing at output terminals 27 will be shifted downward as shown by the curve 62 of FIG. 6A and point B is no longer on the characteristic curve. If the negative pulse applied is sufficiently large, the point B will shift along the curve 62 until it returns to point A.

Figure 6B:
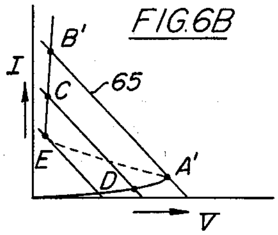
FIG. 6B shows the switching I–V characteristic curve for the prior art double base diode.

It should be noted that the switching circuit of this invention can be returned to the initial state with a smaller negative pulse than conventional switching circuits. This feature will be illustrated with reference to FIG. 6B of the drawings. In FIG. 6B which shows the operation of

2 prior art devices, the load line 65 is superimposed on the I–V curve of FIG. 2. A positive pulse will shift the circuit from A′ to B′. However, this prior art device in order to operate, requires a negative pulse which is sufficiently large to shift the point B′ to E; a shift to point C will not return the system to point A′. According to the present invention, the negative pulse must only be large enough to shift the curve 61 to curve 62 in FIG. 6A. Once this is achieved, the system will shift to point A.

Furthermore, it should be noted that in conventional switching circuits having negative resistance characteristics and in which large emitter current flows, the output flowing into the base electrode 4 of FIG. 1 is relatively small. Consequently, a large resistance $R_L$ is required in these prior art devices to obtain a large variation in the voltage of the base electrode 4. Accordingly, it was impossible to obtain large output power. In contrast with these conventional types, the present invention as shown in FIG. 5 uses a load resistor $R_L$ which may have a resistance of less than 200 ohms when the input current is between 100 and 300 micro-amperes, to obtain a large input-output ratio.

The negative conductance realized in the circuit of this invention can easily be made to deliver uniform characteristics by applying a suitable external circuit. Since the double base diode is a three-terminal element, it is easily controllable and more effective than a two-terminal switching element of the PNPN type semi-conductive device.

The double base diode 1 may be of the type having two P zones within which there is an N zone sandwiched in which case it would be necessary to reverse the polarities of the potentials in the drawing. Of course the emitter will also be connected to a small N zone embedded in one of the P zones, as will be evident to one skilled in the art.

While we have described above the principle of the invention in connection with the specific apparatus, it is to be clearly understood that this description is made only by way of example and not as a limitation to the scope of the information as set forth in the objects thereof and in the accompanying claims.

What is claimed is:

In a negative conductance switching circuit, the combination which comprises:

(A) a double base hook constructed diode in which
  (1) a zone of a first conductivity type material separate two zones of opposite conductivity type material;
  (2) wherein a pocket of material of said first conductivity type material is included in one of said two zones; and
  (3) leads are connected to each of said two zones and said pocket of material;

(B) a biasing arrangement for said diode consisting of:
  (1) a first source of electrical potential connected across the junctions between said zones of opposite conductivity material to said leads connected to said pocket of material and to the other of said two zones;
  (2) a second source of electrical potential connected between the leads connected to said two zones; and
  (3) said first and second sources being similarly poled with respect to said leads connected to said pocket of material and said zone in which said pocket is included:

(C) load impedance means connected in series with said second source of potential between said leads, (D) output means connected across said impedance means, and (E) input terminals for receiving input signals connected to the leads connected to said pocket of material and said other zone.

References Cited in the file of this patent

UNITED STATES PATENTS

| | | |
|---|---|---|
| 2,802,117 | Mathis et al. | Aug. 6, 1957 |
| 2,939,056 | Muller | May 31, 1960 |
| 2,954,527 | Bradmiller | Sept. 27, 1960 |
| 3,026,425 | Anderson | Mar. 20, 1962 |

OTHER REFERENCES

Pub. I Transistor Circuit Eng., by Shea © 1953 page 18, TK 7872, T 73S5tr.

Brown et al.: "Silicon Unijunction Transistor," in Electronic Design, Jan. 22, 1958, pages 30–33, TK7800.E51.